US012776324B2

(12) United States Patent
Laitinen et al.

(10) Patent No.: US 12,776,324 B2
(45) Date of Patent: Oct. 27, 2026

(54) PARAMETRIC SPATIAL AUDIO RENDERING

(71) Applicant: NOKIA TECHNOLOGIES OY, Espoo (FI)

(72) Inventors: Mikko-Ville Laitinen, Espoo (FI); Tapani Pihlajakuja, Kellokoski (FI); Juha Tapio Vilkamo, Helsinki (FI); Adriana Vasilache, Tampere (FI); Lasse Juhani Laaksonen, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 47 days.

(21) Appl. No.: 18/838,799

(22) PCT Filed: Jan. 30, 2023

(86) PCT No.: PCT/EP2023/052139

§ 371 (c)(1),
(2) Date: Aug. 15, 2024

(87) PCT Pub. No.: WO2023/156176

PCT Pub. Date: Aug. 24, 2023

(65) Prior Publication Data

US 2025/0157475 A1 May 15, 2025

(30) Foreign Application Priority Data

Feb. 15, 2022 (GB) ..................................... 2202018

(51) Int. Cl.
*G10L 19/008* (2013.01)
*G10L 19/16* (2013.01)

(52) U.S. Cl.
CPC .......... *G10L 19/008* (2013.01); *G10L 19/167* (2013.01)

(58) Field of Classification Search
CPC ...... G10L 19/008; G10L 19/167; G10L 19/08
See application file for complete search history.

(56) References Cited

U.S. PATENT DOCUMENTS 10,873,814 B2 12/2020 Vilkamo et al.
12,046,250 B2 7/2024 Vasilache
(Continued)

FOREIGN PATENT DOCUMENTS

EP 3707706 A1 9/2020
EP 3861548 A1 8/2021
(Continued)

OTHER PUBLICATIONS

Notice of Reasons for Refusal for Japanese Application No. 2024-548372 dated Oct. 2, 2025, 10 pages.
(Continued)

*Primary Examiner* — Yogeshkumar Patel
(74) *Attorney, Agent, or Firm* — ALSTON & BIRD LLP

(57) ABSTRACT

An apparatus comprising means for: obtaining a bitstream comprising encoded spatial metadata and encoded transport audio signals; decoding transport audio signals from the bitstream encoded transport audio signals; decoding spatial metadata from the bitstream encoded spatial metadata; generating an encoding metric; and generating spatial audio signals from the transport audio signals based on the encoding metric and the spatial metadata.

20 Claims, 6 Drawing Sheets

(56) References Cited

U.S. PATENT DOCUMENTS

| | | | | |
|---|---|---|---|---|
| 2007/0038461 | A1* | 2/2007 | Abbott | G10L 15/30 704/E15.047 |
| 2020/0265851 | A1 | 8/2020 | Fuchs et al. | |
| 2021/0219084 | A1* | 7/2021 | Laitinen | H04S 3/02 |
| 2021/0343300 | A1* | 11/2021 | Küch | G10L 19/008 |
| 2021/0375297 | A1* | 12/2021 | Bruhn | G10L 19/008 |
| 2023/0199417 | A1* | 6/2023 | Laitinen | H04S 7/30 381/303 |
| 2023/0238005 | A1* | 7/2023 | Reutelhuber | G10L 19/008 704/500 |
| 2023/0298601 | A1* | 9/2023 | Gao | G10L 19/008 704/500 |
| 2023/0306975 | A1* | 9/2023 | Fuchs | G10L 19/012 |

FOREIGN PATENT DOCUMENTS

| | | | | |
|---|---|---|---|---|
| GB | 2556093 | | 5/2018 | |
| GB | 2572650 | A | 10/2019 | |
| GB | 2574239 | A | 12/2019 | |
| GB | 2575305 | A | 1/2020 | |
| GB | 2577698 | A | 4/2020 | |
| GB | 2592896 | A | 9/2021 | |
| JP | 2021-503627 | A | 2/2021 | |
| JP | 2021-525392 | A | 9/2021 | |
| WO | WO 2017/005978 | A1 | 1/2017 | |
| WO | WO 2018/091776 | A1 | 5/2018 | |
| WO | WO 2019/091575 | A1 | 5/2019 | |
| WO | WO 2020/010064 | A1 | 1/2020 | |
| WO | WO 2020/070377 | A1 | 4/2020 | |
| WO | WO 2021/048468 | A1 | 3/2021 | |
| WO | WO-2022022876 | A1 * | 2/2022 | G10L 19/008 |
| WO | WO-2022074202 | A2 * | 4/2022 | G10L 19/008 |

OTHER PUBLICATIONS

International Search Report and Written Opinion for Patent Cooperation Treaty Application No. PCT/EP2023/052139 dated Apr. 25, 2023, 9 pages.

Laitinen et al., "Binaural reproduction for directional audio coding", 2009 IEEE Workshop on Applications of Signal Processing to Audio and Acoustics, (Oct. 18-21, 2009), pp. 337-340.

Nokia Corporation, "Proposal for MASA common metadata and metadata structure", 3GPP TSG-SA4 #101 meeting, S4-181353, (Nov. 19-23, 2018), 4 pages.

Pulkki, V., "Spatial sound reproduction with directional audio coding", Journal of the Audio Engineering Society, vol. 55, No. 6, (Jun. 2007), 14 pages.

Search Report for United Kingdom Application No. GB2202018.4 dated Sep. 23, 2022, 3 pages.

Vilkamo et al., "Minimization of decorrelator artifacts in directional audio coding by covariance domain rendering", Journal of the Audio Engineering Society, 61(9), (Sep. 2013), 10 pages.

Vilkamo et al., "Optimized covariance domain framework for time-frequency processing of spatial audio", Journal of the Audio Engineering Society, 61(6), (2013), 403-411.

Notice of Reasons for Refusal for Japanese Application No. 2024-548372 dated Jan. 15, 2026, 8 pages.

First Examination Report for Indian Application No. 202447066976 dated Mar. 12, 2026, 7 pages.

* cited by examiner

PARAMETRIC SPATIAL AUDIO RENDERING

CROSS-REFERENCE TO RELATED APPLICATIONS

The present application is a national phase entry of International Application No. PCT/EP2023/052139, filed Jan. 30, 2023, which claims priority to Great Britain Application No. 2202018.4, Feb. 15, 2022, which are incorporated herein by reference in their entirety.

FIELD

The present application relates to apparatus and methods for spatial audio representation and rendering, but not exclusively for audio representation for an audio decoder.

BACKGROUND

Immersive audio codecs are being implemented supporting a multitude of operating points ranging from a low bit rate operation to transparency. An example of such a codec is the Immersive Voice and Audio Services (IVAS) codec which is being designed to be suitable for use over a communications network such as a 3GPP 4G/5G network including use in such immersive services as for example immersive voice and audio for virtual reality (VR). This audio codec is expected to handle the encoding, decoding and rendering of speech, music and generic audio. It is furthermore expected to support channel-based audio and scene-based audio inputs including spatial information about the sound field and sound sources. The codec is also expected to operate with low latency to enable conversational services as well as support high error robustness under various transmission conditions.

Metadata-assisted spatial audio (MASA) is one input format proposed for IVAS. It uses audio signal(s) together with corresponding spatial metadata. The spatial metadata comprises parameters which define the spatial aspects of the audio signals and which may contain for example, directions and direct-to-total energy ratios in frequency bands. The MASA stream can, for example, be obtained by capturing spatial audio with microphones of a suitable capture device. For example a mobile device comprising multiple microphones may be configured to capture microphone signals where the set of spatial metadata can be estimated based on the captured microphone signals. The MASA stream can be obtained also from other sources, such as specific spatial audio microphones (such as Ambisonics), studio mixes (for example, a 5.1 audio channel mix) or other content by means of a suitable format conversion.

SUMMARY

There is provided according to a first aspect an apparatus comprising means for: obtaining a bitstream comprising encoded spatial metadata and encoded transport audio signals; decoding transport audio signals from the bitstream encoded transport audio signals; decoding spatial metadata from the bitstream encoded spatial metadata; generating an encoding metric; and generating spatial audio signals from the transport audio signals based on the encoding metric and the spatial metadata.

The means may be further for generating a smoothing control based on the encoding metric, and wherein the means for generating spatial audio signals from the transport audio signals based on the encoding metric and the spatial metadata may be for generating spatial audio signals from the transport audio signals based on the smoothing control and the spatial metadata.

The means for generating spatial audio signals from the transport audio signals based on the encoding metric and the spatial metadata may be further for modifying at least an energy ratio from the spatial metadata based on the encoding metric, wherein the spatial audio signals may be generated from the transport audio signals based on the modified energy ratio and the spatial metadata.

The means for generating spatial audio signals from the transport audio signals based on the encoding metric and the spatial metadata may be for positioning a directional sound to a direction determined by the spatial metadata wherein the width of the directional sound is based on the encoding metric.

The means for generating a spatial audio signal from the transport audio signals based on the encoding metric and the spatial metadata may be for: generating covariance matrices from the transport audio signals and the spatial metadata based on the encoding metric; generating a processing matrix based on the covariance matrices; and decorrelating and/or mixing the transport audio signals based on the processing matrices to generate the spatial audio signals.

The covariance matrices may comprise at least one of: input covariance matrices, representing the transport audio signals; and target covariance matrices, representing the spatial audio signals.

The means for generating covariance matrices from the transport audio signals and the spatial metadata may be for generating the input covariance matrices by measuring the transport audio signals in a time-frequency domain.

The means for generating covariance matrices from the transport audio signals and the spatial metadata may be for generating the target covariance matrices based on the spatial metadata and transport audio signal energy.

The means may be further for applying temporal averaging to the covariance matrices to generate averaged covariance matrices, the temporal averaging being based on the smoothing control, wherein generating the processing matrix based on the covariance matrices may be for generating the processing matrix from the averaged covariance matrices.

The means for generating covariance matrices from the transport audio signals and the spatial metadata may be for generating the covariance matrices based on the modified energy ratio.

The means for generating covariance matrices from the transport audio signals may be for generating the covariance matrices based on the positioning of the directional sound to the direction determined by the spatial metadata wherein the width of the directional sound is based on the encoding metric.

The means for generating spatial audio signals from the transport audio signals based on the encoding metric and the spatial metadata may be for: obtaining at least one direct-to-total energy ratio parameter based on the spatial metadata; dividing the transport audio signals into directional and non-directional parts in frequency bands based on at least one direct-to-total energy ratio parameter from the spatial metadata; positioning the directional part of the transport audio signals to at least one of a plurality of loudspeakers using amplitude panning; distributing and decorrelating the non-directional part of the transport audio signals to all of the plurality of loudspeakers; and generating combined audio signals based on combining the positioned directional part of the transport audio signals and non-directional part of the transport audio signals.

The loudspeakers may be virtual loudspeakers, and the means may further for generating a binaural spatial audio signals by the application of a head-related transfer function to the combined audio signals.

The means for obtaining at least one direct-to-total energy ratio parameter based on the spatial metadata may be for obtaining the at least one direct-to-total energy ratio from the modified energy ratio.

The means for positioning the directional part of the transport audio signals to at least one of a plurality of loudspeakers using amplitude panning may be for positioning the directional part of the transport audio signals to at least one of a plurality of loudspeakers using amplitude panning based on the smoothing control.

The means for positioning the directional sound to the direction determined by the spatial metadata may be for positioning of the directional sound to the at least one of the plurality of loudspeakers using amplitude panning wherein the width of the positioning may be based on the encoding metric.

The means for generating the encoding metric may be for generating the encoding metric based on a quality of representation of the spatial metadata.

The means for generating the encoding metric may be for generating the encoding metric from the encoded spatial metadata and the spatial metadata.

The means for generating the encoding metric from the encoded spatial metadata and the spatial metadata may be for: determining a first parameter indicating a number of bits intended or allocated for encoding a spatial parameter for a frame; determining a second parameter indicating a number of bits used after encoding the spatial parameter has been performed for the frame; and generating the encoding metric as the ratio between the first and second parameter.

The spatial parameter may be a direction index representing a quantized direction parameter value.

The means for generating the encoding metric may be for generating the encoding metric based on at least one of: a quantization resolution of the spatial metadata; and a ratio between at least two quantization resolutions of the spatial metadata.

According to a second aspect there is provided a method comprising: obtaining a bitstream comprising encoded spatial metadata and encoded transport audio signals; decoding transport audio signals from the bitstream encoded transport audio signals; decoding spatial metadata from the bitstream encoded spatial metadata; generating an encoding metric; and generating spatial audio signals from the transport audio signals based on the encoding metric and the spatial metadata.

The method may further comprise generating a smoothing control based on the encoding metric, and wherein generating spatial audio signals from the transport audio signals based on the encoding metric and the spatial metadata may comprise generating spatial audio signals from the transport audio signals based on the smoothing control and the spatial metadata.

Generating spatial audio signals from the transport audio signals based on the encoding metric and the spatial metadata may comprise modifying at least an energy ratio from the spatial metadata based on the encoding metric, wherein the spatial audio signals may be generated from the transport audio signals based on the modified energy ratio and the spatial metadata.

Generating spatial audio signals from the transport audio signals based on the encoding metric and the spatial metadata may comprise positioning a directional sound to a direction determined by the spatial metadata wherein the width of the directional sound is based on the encoding metric.

Generating a spatial audio signal from the transport audio signals based on the encoding metric and the spatial metadata may comprise: generating covariance matrices from the transport audio signals and the spatial metadata based on the encoding metric; generating a processing matrix based on the covariance matrices; and decorrelating and/or mixing the transport audio signals based on the processing matrices to generate the spatial audio signals.

The covariance matrices may comprise at least one of: input covariance matrices, representing the transport audio signals; and target covariance matrices, representing the spatial audio signals.

Generating covariance matrices from the transport audio signals and the spatial metadata may comprise generating the input covariance matrices by measuring the transport audio signals in a time-frequency domain.

Generating covariance matrices from the transport audio signals and the spatial metadata may comprise generating the target covariance matrices based on the spatial metadata and transport audio signal energy.

The method may further comprise applying temporal averaging to the covariance matrices to generate averaged covariance matrices, the temporal averaging being based on the smoothing control, wherein generating the processing matrix based on the covariance matrices may comprise generating the processing matrix from the averaged covariance matrices.

Generating covariance matrices from the transport audio signals and the spatial metadata may comprise generating the covariance matrices based on the modified energy ratio.

Generating covariance matrices from the transport audio signals may comprise generating the covariance matrices based on the positioning of the directional sound to the direction determined by the spatial metadata wherein the width of the directional sound is based on the encoding metric.

Generating spatial audio signals from the transport audio signals based on the encoding metric and the spatial metadata may comprise: obtaining at least one direct-to-total energy ratio parameter based on the spatial metadata; dividing the transport audio signals into directional and non-directional parts in frequency bands based on at least one direct-to-total energy ratio parameter from the spatial metadata; positioning the directional part of the transport audio signals to at least one of a plurality of loudspeakers using amplitude panning; distributing and decorrelating the non-directional part of the transport audio signals to all of the plurality of loudspeakers; and generating combined audio signals based on combining the positioned directional part of the transport audio signals and non-directional part of the transport audio signals.

The loudspeakers may be virtual loudspeakers, and the method may further comprise generating a binaural spatial audio signals by the application of a head-related transfer function to the combined audio signals.

Obtaining at least one direct-to-total energy ratio parameter based on the spatial metadata may comprise obtaining the at least one direct-to-total energy ratio from the modified energy ratio.

Positioning the directional part of the transport audio signals to at least one of a plurality of loudspeakers using amplitude panning may comprise positioning the directional part of the transport audio signals to at least one of a plurality of loudspeakers using amplitude panning based on the smoothing control.

Positioning the directional sound to the direction determined by the spatial metadata may comprise positioning of the directional sound to the at least one of the plurality of loudspeakers using amplitude panning wherein the width of the positioning may be based on the encoding metric.

Generating the encoding metric may comprise generating the encoding metric based on a quality of representation of the spatial metadata.

Generating the encoding metric may comprise generating the encoding metric from the encoded spatial metadata and the spatial metadata.

Generating the encoding metric from the encoded spatial metadata and the spatial metadata may comprise: determining a first parameter indicating a number of bits intended or allocated for encoding a spatial parameter for a frame; determining a second parameter indicating a number of bits used after encoding the spatial parameter has been performed for the frame; and generating the encoding metric as the ratio between the first and second parameter.

The spatial parameter may be a direction index representing a quantized direction parameter value.

Generating the encoding metric may comprise generating the encoding metric based on at least one of: a quantization resolution of the spatial metadata; and a ratio between at least two quantization resolutions of the spatial metadata.

According to a third aspect there is provided an apparatus the apparatus comprising at least one processor and at least one memory including a computer program code, the at least one memory and the computer program code configured to, with the at least one processor, cause the apparatus at least to: obtain a bitstream comprising encoded spatial metadata and encoded transport audio signals; decode transport audio signals from the bitstream encoded transport audio signals; decode spatial metadata from the bitstream encoded spatial metadata; generate an encoding metric; and generate spatial audio signals from the transport audio signals based on the encoding metric and the spatial metadata.

The apparatus may be further caused to generate a smoothing control based on the encoding metric, and wherein the apparatus caused to generate spatial audio signals from the transport audio signals based on the encoding metric and the spatial metadata may be caused to generate spatial audio signals from the transport audio signals based on the smoothing control and the spatial metadata.

The apparatus caused to generate spatial audio signals from the transport audio signals based on the encoding metric and the spatial metadata may be further caused to modify at least an energy ratio from the spatial metadata based on the encoding metric, wherein the spatial audio signals may be generated from the transport audio signals based on the modified energy ratio and the spatial metadata.

The apparatus caused to generate spatial audio signals from the transport audio signals based on the encoding metric and the spatial metadata may be caused to position a directional sound to a direction determined by the spatial metadata wherein the width of the directional sound is based on the encoding metric.

The apparatus caused to generate a spatial audio signal from the transport audio signals based on the encoding metric and the spatial metadata may be caused to: generate covariance matrices from the transport audio signals and the spatial metadata based on the encoding metric; generate a processing matrix based on the covariance matrices; and decorrelate and/or mix the transport audio signals based on the processing matrices to generate the spatial audio signals.

The covariance matrices may comprise at least one of: input covariance matrices, representing the transport audio signals; and target covariance matrices, representing the spatial audio signals.

The apparatus caused to generate covariance matrices from the transport audio signals and the spatial metadata may be caused to generate the input covariance matrices by measuring the transport audio signals in a time-frequency domain.

The apparatus caused to generate covariance matrices from the transport audio signals and the spatial metadata may be caused to generate the target covariance matrices based on the spatial metadata and transport audio signal energy.

The apparatus may be caused to apply temporal averaging to the covariance matrices to generate averaged covariance matrices, the temporal averaging being based on the smoothing control, wherein the apparatus caused to generate the processing matrix based on the covariance matrices may be caused to generate the processing matrix from the averaged covariance matrices.

The apparatus caused to generate covariance matrices from the transport audio signals and the spatial metadata may be caused to generate the covariance matrices based on the modified energy ratio.

The apparatus caused to generate covariance matrices from the transport audio signals may be caused to generate the covariance matrices based on the positioning of the directional sound to the direction determined by the spatial metadata wherein the width of the directional sound is based on the encoding metric.

The apparatus caused to generate spatial audio signals from the transport audio signals based on the encoding metric and the spatial metadata may be caused to: obtain at least one direct-to-total energy ratio parameter based on the spatial metadata; divide the transport audio signals into directional and non-directional parts in frequency bands based on at least one direct-to-total energy ratio parameter from the spatial metadata; positioning the directional part of the transport audio signals to at least one of a plurality of loudspeakers using amplitude panning; distribute and decorrelate the non-directional part of the transport audio signals to all of the plurality of loudspeakers; and generate combined audio signals based on combining the positioned directional part of the transport audio signals and non-directional part of the transport audio signals.

The loudspeakers may be virtual loudspeakers, the apparatus may further be caused to generate a binaural spatial audio signals by the application of a head-related transfer function to the combined audio signals.

The apparatus caused to obtain at least one direct-to-total energy ratio parameter based on the spatial metadata may be caused to obtain the at least one direct-to-total energy ratio from the modified energy ratio.

The apparatus caused to position the directional part of the transport audio signals to at least one of a plurality of loudspeakers using amplitude panning may be caused to position the directional part of the transport audio signals to at least one of a plurality of loudspeakers using amplitude panning based on the smoothing control.

The apparatus caused to position the directional sound to the direction determined by the spatial metadata may be caused to position the directional sound to the at least one of the plurality of loudspeakers using amplitude panning wherein the width of the positioning may be based on the encoding metric.

The apparatus caused to generate the encoding metric may be caused to generate the encoding metric based on a quality of representation of the spatial metadata.

The apparatus caused to generate the encoding metric may be caused to generate the encoding metric from the encoded spatial metadata and the spatial metadata.

The apparatus caused to generate the encoding metric from the encoded spatial metadata and the spatial metadata may be caused to: determine a first parameter indicating a number of bits intended or allocated for encoding a spatial parameter for a frame; determine a second parameter indicating a number of bits used after encoding the spatial parameter has been performed for the frame; and generate the encoding metric as the ratio between the first and second parameter.

The spatial parameter may be a direction index representing a quantized direction parameter value.

The apparatus caused to generate the encoding metric may be caused to generate the encoding metric based on at least one of: a quantization resolution of the spatial metadata; and a ratio between at least two quantization resolutions of the spatial metadata.

According to a fourth aspect there is provided an apparatus comprising: obtaining circuitry configured to obtain a bitstream comprising encoded spatial metadata and encoded transport audio signals; decoding circuitry configured to decode transport audio signals from the bitstream encoded transport audio signals; decoding circuitry configured to decode spatial metadata from the bitstream encoded spatial metadata; generating circuitry configured to generate an encoding metric; and generating circuitry configured to generate spatial audio signals from the transport audio signals based on the encoding metric and the spatial metadata.

According to a fifth aspect there is provided a computer program comprising instructions [or a computer readable medium comprising program instructions] for causing an apparatus to perform at least the following: obtaining a bitstream comprising encoded spatial metadata and encoded transport audio signals; decoding transport audio signals from the bitstream encoded transport audio signals; decoding spatial metadata from the bitstream encoded spatial metadata; generating an encoding metric; and generating spatial audio signals from the transport audio signals based on the encoding metric and the spatial metadata.

According to a sixth aspect there is provided a non-transitory computer readable medium comprising program instructions for causing an apparatus to perform at least the following: obtaining a bitstream comprising encoded spatial metadata and encoded transport audio signals; decoding transport audio signals from the bitstream encoded transport audio signals; decoding spatial metadata from the bitstream encoded spatial metadata; generating an encoding metric; and generating spatial audio signals from the transport audio signals based on the encoding metric and the spatial metadata.

According to a seventh aspect there is provided an apparatus comprising: means for obtaining a bitstream comprising encoded spatial metadata and encoded transport audio signals; means for decoding transport audio signals from the bitstream encoded transport audio signals; means for decoding spatial metadata from the bitstream encoded spatial metadata; means for generating an encoding metric; and means for generating spatial audio signals from the transport audio signals based on the encoding metric and the spatial metadata.

According to an eighth aspect there is provided a computer readable medium comprising program instructions for causing an apparatus to perform at least the following: obtaining a bitstream comprising encoded spatial metadata and encoded transport audio signals; decoding transport audio signals from the bitstream encoded transport audio signals; decoding spatial metadata from the bitstream encoded spatial metadata; generating an encoding metric; and generating spatial audio signals from the transport audio signals based on the encoding metric and the spatial metadata.

An apparatus comprising means for performing the actions of the method as described above.

An apparatus configured to perform the actions of the method as described above.

A computer program comprising program instructions for causing a computer to perform the method as described above.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which.

EMBODIMENTS OF THE APPLICATION

Figure 1:
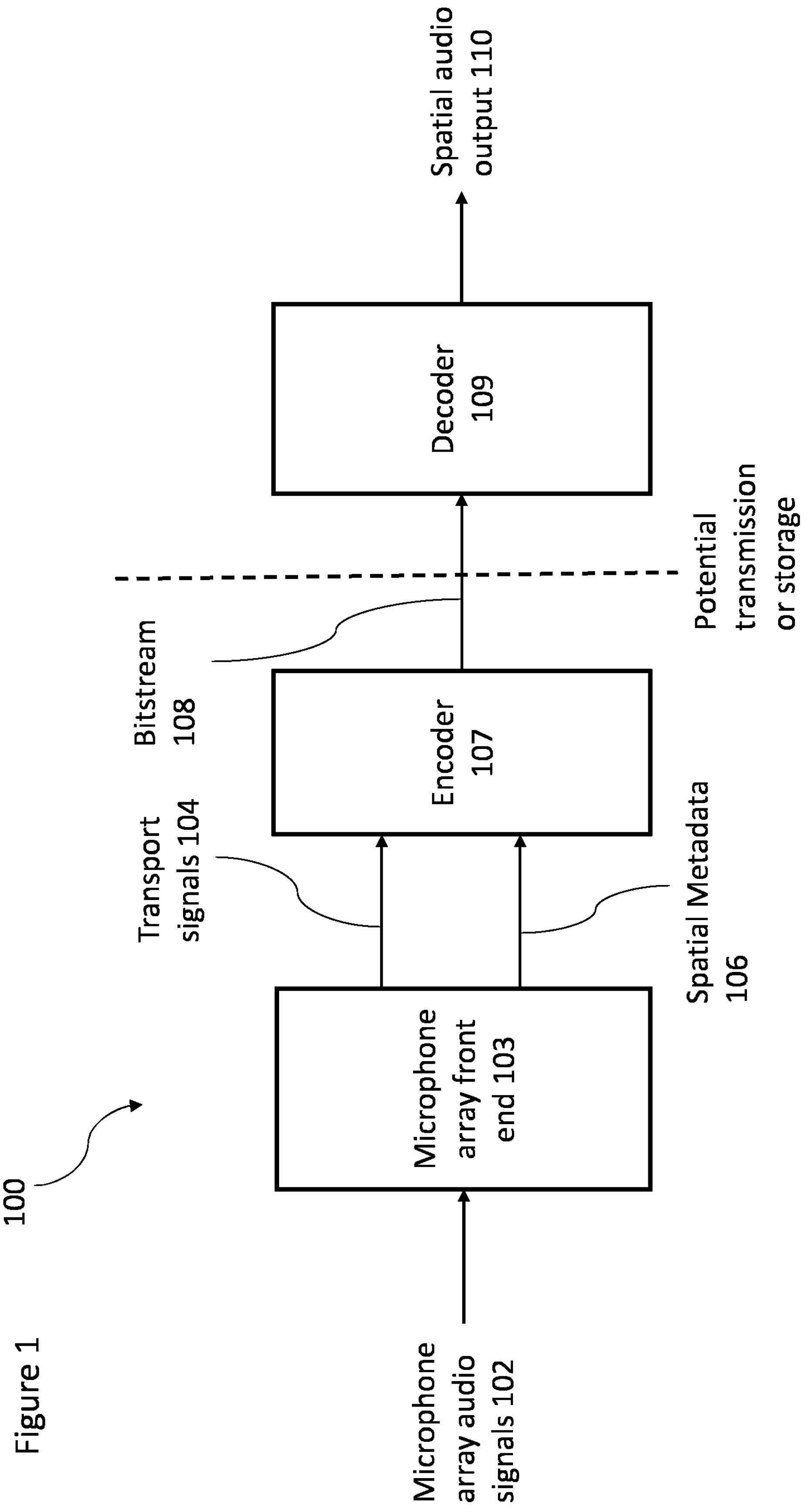
FIG. 1 shows schematically a system of apparatus suitable for implementing some embodiments.

The following describes in further detail suitable apparatus and possible mechanisms for the decoding of parametric spatial audio streams comprising transport audio signals and spatial metadata.

As discussed above Metadata-Assisted Spatial Audio (MASA) is an example of a parametric spatial audio format and representation suitable as an input format for IVAS.

MASA, for example, can define an audio scene as an audio representation consisting of 'N channels+spatial metadata'. It is a scene-based audio format particularly suited for spatial audio capture on practical devices, such as smartphones. The idea is to describe the sound scene in terms of time- and frequency-varying sound source directions and, e.g., energy ratios. Sound energy that is not defined (described) by the directions, is described as diffuse (coming from all directions).

As discussed above spatial metadata associated with the audio signals may comprise multiple parameters (such as multiple directions and associated with each direction a direct-to-total ratio, spread coherence, distance, etc.) per time-frequency tile. The spatial metadata may also comprise other parameters or may be associated with other parameters which are considered to be non-directional (such as surround coherence, diffuse-to-total energy ratio, remainder-to-total energy ratio) but when combined with the directional parameters are able to be used to define the characteristics of the audio scene. For example a reasonable design choice which is able to produce a good quality output is one where the spatial metadata comprises one or more directions for each time-frequency subframe (and associated with each direction direct-to-total ratios, spread coherence, distance values etc) are determined.

As described above, parametric spatial metadata representation can use multiple concurrent spatial directions. With MASA, the proposed maximum number of concurrent directions is two. For each concurrent direction, there may be associated parameters such as: Direction index; Direct-to-total ratio; Spread coherence; and Distance. In some embodiments other parameters such as Diffuse-to-total energy ratio; Surround coherence; and Remainder-to-total energy ratio are defined.

At very low bit rates (e.g., around 13.2-16.4 kbps), there are very few bits available for coding the metadata. For example only about 3 kbps may be used for the coding of the metadata to obtain sufficient bitrate for the audio signal codec.

To have sufficient frequency and temporal resolution (for example having 5 frequency bands and having 20 milliseconds temporal resolution), in many cases only a few bits can be used per value (e.g., the direction parameter). In practice, this means that the quantization steps are relatively large. Thus, for example, for a certain time-frequency tile the quantization points are at 0, +45, +90, +135, and 180 degrees of azimuth.

As the directional resolution of the human hearing is about 1-2 degrees in the azimuth direction, jumps from, for example 0 to 45 degrees can be easily perceived, and decrease the perceived audio quality, making the reproduction unnatural.

This can be mitigated by adding temporal smoothing to the rendering. For example, when rendering a binaural signal from microphone signals the processing values (based on the spatial metadata) may be temporally averaged using a first-order IIR (infinite impulse response) filter. Depending on the rendering scheme, in other configurations the temporal averaging is performed on the measured multi-microphone input covariance matrix (or in case of a spatial audio decoder the measured covariance matrix of the transport audio signal(s), or the measured covariance matrix of any other type of input signal(s)) and metadata-based target covariance matrix, where the processing values are then determined based on these averaged matrices.

As a result, the jumps due to low directional resolution can be mitigated, and instead, the directions are perceived to change smoothly. However, adding smoothing also adds sluggishness and lag to the rendering. For example, a sudden sound source activity at a certain direction may be reproduced only vaguely at its direction, at least at the first moments of its activity. The more smoothing is employed, the more sluggish the rendering and the overall experience is one with more lag. Thus, the amount of temporal smoothing applied is a compromise between fast and responsive rendering versus mitigating the artefacts from rapidly changing directions.

There can be a problem if the smoothing is applied (tuned) in a way that the artefacts from the jumping directions are handled even in the worst cases (for example when encoding a complex sound scene which would be difficult to code efficiently with a low bit rate), the required amount of the temporal smoothing is quite large, and the rendering produced would be quite sluggish and lag ridden. If this kind of rendering is also applied at higher bitrates, where the direction resolution is significantly better, suboptimal quality is experienced.

On the other hand, if the temporal smoothing is tuned to be optimal at higher bit rates, having fast and responsive rendering, the reproduction is perceived to be spatially unstable at the lower bit rates.

Moreover, typically the achieved direction resolution is not fixed at a certain bit rate and depends on how well the encoding can compress the content data. Thus any approach where the smoothing time-constant is fixed will always produce suboptimal results as the direction resolution may change over time and frequency.

Temporal smoothing of the processing parameters has also been used in various parametric spatial audio processing methods. For example, in Directional Audio Coding (DirAC) in Pulkki, V. (2007). *Spatial sound reproduction with directional audio coding. Journal of the Audio Engineering Society,* 55 (6), 503-516 employs temporal smoothing applied to the loudspeaker panning gains. In Vilkamo, J., Bäckström, T., & Kuntz, A. (2013). *Optimized covariance domain framework for time-frequency processing of spatial audio. Journal of the Audio Engineering Society,* 61 (6), 403-411 a method was proposed that determined the spatial audio processing in covariance matrices, and for example in Vilkamo, J., & Pulkki, V. (2013). *Minimization of decorrelator artifacts in directional audio coding by covariance domain rendering. Journal of the Audio Engineering Society,* 61 (9), 637-646 describes performing DirAC rendering where it was described that the covariance matrices were averaged with first-order IIR filters so that the covariance matrices at lower frequencies were averaged more. The averaging of the covariance matrices caused the overall resulting processing gains to be temporally smoother to avoid too abrupt processing, i.e., artefacts. However, these methods do not consider loss of parameter accuracy in encoding, nor did they vary the amount of averaging over time.

The concept as discussed in further detail in the following embodiments thus relates to rendering of encoded parametric spatial audio (i.e., audio signal(s) and spatial metadata), where apparatus and methods are described that enable spatial audio rendering optimized based on the quality of the encoding of the spatial metadata. This in some embodiments can be achieved by obtaining an (encoded) spatial audio stream (containing audio signal(s) and spatial metadata), determining a metric describing the achieved quality of the encoding of the metadata for a certain time and/or frequency interval, adjusting a renderer based on the metric (e.g., tuning the amount of the temporal smoothing and/or ambience processing in a binaural renderer), and rendering spatial audio using the adjusted renderer based on the audio signal(s) and the spatial metadata.

Embodiments will be described with respect to an example capture (or encoder/analyser) and playback (or decoder/synthesizer) apparatus or system 100 as shown in FIG. 1. In the following example the audio signal input is one from a microphone array, however it would be appreciated that the audio input can be any suitable audio input format and the description hereafter details, where differences in the processing occurs when a differing input format is employed.

The system 100 is shown with capture part and a playback (decoder/synthesizer) part.

The capture part in some embodiments comprises a microphone array audio signals input 102. The input audio signals can be from any suitable source, for example: two or more microphones mounted on a mobile phone, other microphone arrays, e.g., B-format microphone or Eigenmike. In some embodiments, as mentioned above, the input can be any suitable audio signal input such as Ambisonic signals, e.g., first-order Ambisonics (FOA), higher-order Ambisonics (HOA) or Loudspeaker surround mix and/or objects.

The microphone array audio signals input 102 may be provided to a microphone array front end 103. The microphone array front end in some embodiments is configured to implement an analysis processor functionality configured to generate or determine suitable (spatial) metadata associated with the audio signals and implement a suitable transport signal generator functionality to generate transport audio signals.

The analysis processor functionality is thus configured to perform spatial analysis on the input audio signals yielding suitable spatial metadata 106 in frequency bands. For all of the aforementioned input types, there exists known methods to generate suitable spatial metadata, for example directions and direct-to-total energy ratios (or similar parameters such as diffuseness, i.e., ambient-to-total ratios) in frequency bands. These methods are not detailed herein, however, some examples may comprise the performing of a suitable time-frequency transform for the input signals, and then in frequency bands when the input is a mobile phone microphone array, estimating delay-values between microphone pairs that maximize the inter-microphone correlation, and formulating the corresponding direction value to that delay (as described in GB Patent Application Number 1619573.7 and PCT Patent Application Number PCT/FI2017/050778), and formulating a ratio parameter based on the correlation value. The direct-to-total energy ratio parameter for multichannel captured microphone array signals can be estimated based on the normalized cross-correlation parameter cor'(k, n) between a microphone pair at band k, the value of the cross-correlation parameter lies between −1 and 1. A direct-to-total energy ratio parameter r(k, n) can be determined by comparing the normalized cross-correlation parameter to a diffuse field normalized cross correlation parameter $$cor'_D(k, n)$$

as $$r(k, n) = \frac{cor'(k, n) - cor'_D(k, n)}{1 - cor'_D(k, n)},$$

and then limiting the result between 0 and 1. The direct-to-total energy ratio is explained further in PCT publication WO2017/005978 which is incorporated herein by reference.

The metadata can be of various forms and in some embodiments comprise spatial metadata and other metadata.

A typical parameterization for the spatial metadata is one direction parameter in each frequency band characterized as an azimuth value $\phi$ (k, n) value and elevation value $\theta$ (k, n) and an associated direct-to-total energy ratio in each frequency band r(k, n), where k is the frequency band index and n is the temporal frame index.

In some embodiments the parameters generated may differ from frequency band to frequency band. Thus, for example in band X all of the parameters are generated and transmitted, whereas in band Y only one of the parameters is generated and transmitted, and furthermore in band Z no parameters are generated or transmitted. A practical example of this may be that for some frequency bands such as the highest band some of the parameters are not required for perceptual reasons.

In some embodiments when the audio input is a FOA signal or B-format microphone the analysis processor functionality can be configured to determine parameters such as an intensity vector, based on which the direction parameter is obtained, and to compare the intensity vector length to the overall sound field energy estimate to determine the ratio parameter. This method is known in the literature as Directional Audio Coding (DirAC).

In some embodiments when the input is HOA signal, the analysis processor functionality may either take the FOA subset of the signals and use the method above, or divide the HOA signal into multiple sectors, in each of which the method above is utilized. This sector-based method is known in the literature as higher order DirAC (HO-DirAC). In this case, there is more than one simultaneous direction parameter per frequency band.

In some embodiments when the input format is a loudspeaker surround mix and/or objects, the analysis processor functionality may be configured to convert the signal into a FOA signal(s) (via use of spherical harmonic encoding gains) and to analyse direction and ratio parameters as above.

As such the output of the analysis processor functionality is (spatial) metadata 106 determined in frequency bands. The (spatial) metadata 106 may involve directions and energy ratios in frequency bands but may also have any of the metadata types listed previously. The (spatial) metadata 106 can vary over time and over frequency.

In some embodiments the analysis functionality is implemented external to the system 100. For example, in some embodiments the spatial metadata associated with the input audio signals may be provided to an encoder 107 as a separate bit-stream. In some embodiments the spatial metadata may be provided as a set of spatial (direction) index values.

The microphone array front end 103, as described above is further configured to implement transport signal generator functionality, in order to generate suitable transport audio signals 104. The transport signal generator functionality is configured to receive the input audio signals, which may for example be the microphone array audio signals 102 and generate the transport audio signals 104. The transport audio signals may be a multi-channel, stereo, binaural or mono audio signal. The generation of transport audio signals 104 can be implemented using any suitable method such as summarised below.

When the input is microphone array audio signals, the transport signal generator functionality may be selecting a left-right microphone pair, and applying suitable processing to the signal pair, such as automatic gain control, microphone noise removal, wind noise removal, and equalization.

When the input is a FOA/HOA signal or B-format microphone, the transport signals 104 may be directional beam signals towards left and right directions, such as two opposing cardioid signals.

When the input is loudspeaker surround mix and/or objects, the transport signals 104 may be a downmix signal that combines left side channels to left downmix channel, and same for right side, and adds centre channels to both transport channels with a suitable gain.

In some embodiments the transport signals 104 are the input audio signals, for example the microphone array audio signals. The number of transport channels can also be any suitable number (rather than one or two channels as discussed in the examples).

In some embodiments the capture part may comprise an encoder 107. The encoder 107 can be configured to receive the transport audio signals 104 and the spatial metadata 106. The encoder 107 may furthermore be configured to generate a bitstream 108 comprising an encoded or compressed form of the metadata information and transport audio signals.

The encoder 107, for example, could be implemented as an IVAS encoder, or any other suitable encoder. The encoder 107, in such embodiments is configured to encode the audio signals and the metadata and form an IVAS bit stream.

This bitstream 108 may then be transmitted/stored as shown by the dashed line.

The system 100 furthermore may comprise a decoder 109 part. The decoder 109 is configured to receive, retrieve or otherwise obtain the bitstream 108 and from the bitstream generate suitable spatial audio signals 110 to be presented to the listener/listener playback apparatus.

The decoder 109 is therefore configured to receive the bitstream 108 and demultiplex the encoded streams and then decode the audio signals to obtain the transport signals and metadata.

The decoder 109 furthermore can be configured to, from the transport audio signals and the spatial metadata, produce the spatial audio signals output 110 for example a binaural audio signal that can be reproduced over headphones.

With reference to FIG. 1, it was mentioned that part of the functionality of the encoder 107 is to encode the spatial audio parameters (MASA), in other words the spatial metadata 106. For example, the direction values (azimuth and elevation values $\phi$ (k, n) and $\theta$ (k, n)) may be first quantized according to a spherical quantization scheme. Such a scheme can be found in the patent publication EP3707706. Generally, each type of spatial audio parameter is first quantized in order to obtain a quantization index.

The resulting quantization indices for the spatial audio parameters (e.g. MASA parameters) can then be entropy encoded at differing coding rates in response to a factor stipulating the number of bits of bits allocated for the task. As mentioned above, the codec system can use a number of different coding rates and this also applies to the encoding of the indices of the spatial audio parameters. For example, a general framework for the encoding of the index values of the direction parameters for all TF tiles in a frame may have the following form.

Input: indices of quantized directional parameters (azimuth and elevation) and allowed number of bits $B_{allowed}$

```
1. Use EC1 for encoding the parameters
2. If bits_EC1 < B_allowed
   a. Encode with EC1
```

-continued

```
3. Else
   a. Use bandwise encoding EC2 (with a potential quantization resolution
      decrease)
   b. If bits_EC2 < B_allowed
      i. Encode using EC2
   c. Else
      i. Reduce quantization resolution
      ii. Use EC3
   d. End if
4. End if
```

In the above EC1 corresponds to a first entropy encoding scheme in which the azimuth and elevation indices can be separately encoded. The scheme uses an optimized fixed value average index which is subtracted from each index resulting in a difference index for each direction index. In these schemes there is one average for azimuth and one average for elevation. The average is taken over the entire frame, for those frequency tiles that have an energy ratio larger than a threshold (for those it is more efficient to send the joint index of elevation and azimuth together for one time frequency tile). Each resulting difference index may then be transformed to a positive value and then be entropy encoded using a Golomb Rice scheme. The optimized average index may also be entropy encoded for transmission to the decoder.

EC2 corresponds to a second entropy encoding scheme, which encodes the difference indices with less resolution than EC1. Details of a suitable second entropy encoding scheme may be found in the patent publication WO2021/048468.

EC3 corresponds to a third entropy encoding scheme, which encodes the difference indices with a resolution which is less than EC2. In this respect EC3 may constitute the lowest resolution quantisation scheme in the above general framework. Details of a scheme suitable for use may be found in the patent publication EP3861548.

It can be seen from the above general framework that the choice of encoding rate (and therefore encoding scheme) may be determined in part by a parameter $B_{allowed}$ indicating the number of bits allowed for the encoding of the direction indices for the frame. $B_{allowed}$ may be an encoding system determined parameter in accordance with the overall operating point/bit rate of the encoder for a particular time frame.

As seen from above the parameter $B_{allowed}$ can be used to determine an entropy coding scheme by essentially checking whether the bits required for an entropy encoding scheme is less than the parameter $B_{allowed}$. This checking process is performed in a decreasing order of bits required for an entropy encoding scheme. The result of the checking process is that the highest order (of encoding bits) entropy encoding scheme is chosen which satisfies the constraint of $B_{allowed}$.

For example, if the number of bits (bits_EC1) required for the first entropy encoded scheme EC1 is less than $B_{allowed}$, then the first entropy encoded scheme is used. However, if it is determined that the bits required for EC1 is greater than the constraint $B_{allowed}$ then the number of bits (bits_EC2) required for the second entropy encoded scheme EC2 is checked against $B_{allowed}$. If this second check indicates that the bits required for EC2 is less than $B_{allowed}$ then the second entropy encoded scheme EC2 is used to entropy encode the direction indices for the frame. However, if the second check indicates that the bits required for EC2 is greater than (or equal) to $B_{allowed}$ then the third entropy encoded scheme EC3 is chosen to encode the direction indices.

The above general framework can be expanded for any number of encoding rates, where each entropy encoding scheme is chosen in accordance the number of bits required (bits_ECn) and bits allowed $B_{allowed}$.

Figure 2:
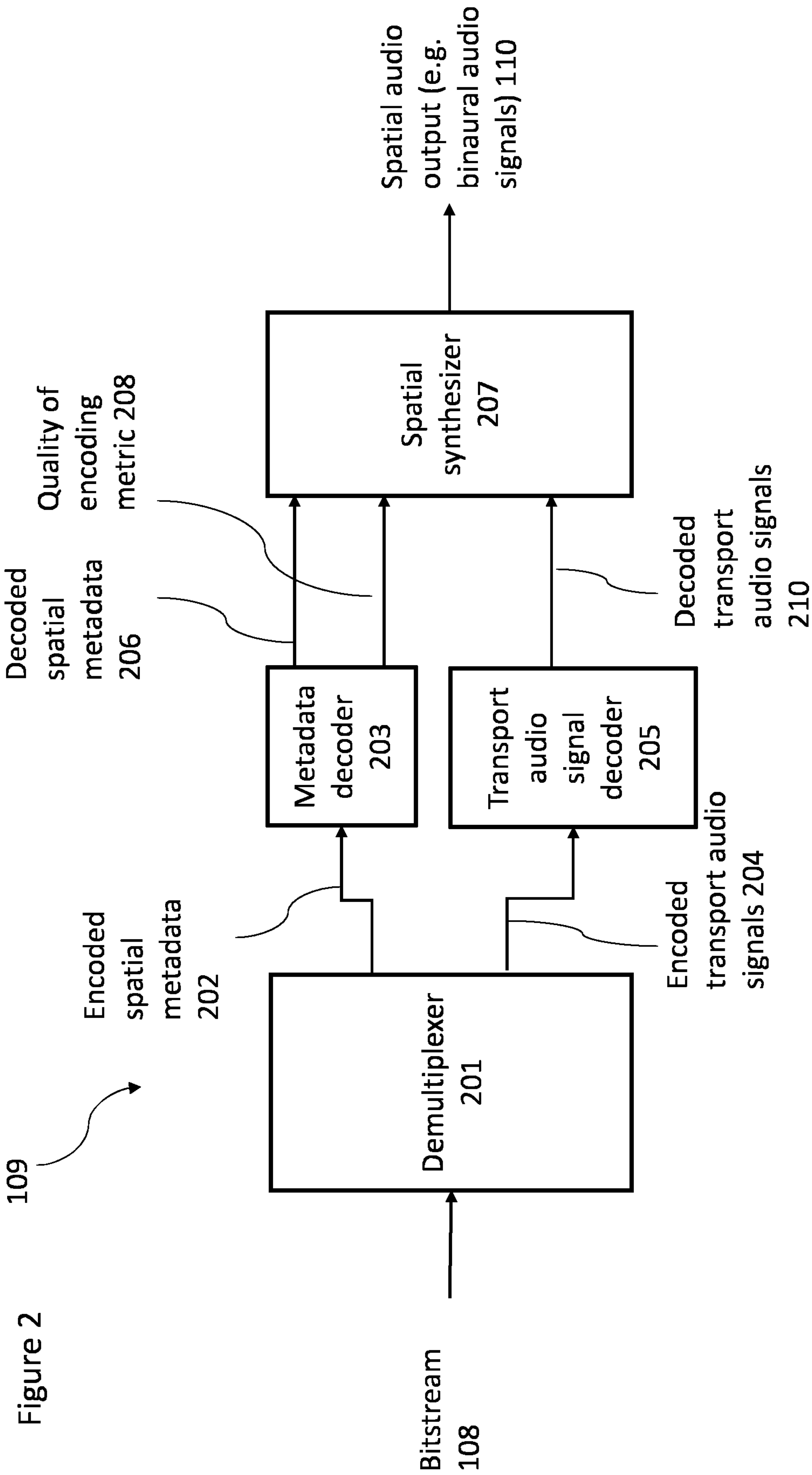
FIG. 2 shows schematically a decoder as shown in the system of apparatus as shown in FIG. 1 according to some embodiments.

FIG. 2 shows the decoder 109 in further detail.

The decoder 109 in some embodiments comprises a demultiplexer 201 configured to accept and demultiplex the bitstream 108 to obtain the encoded transport audio signals 204 and the encoded spatial audio parameters metadata (MASA metadata) 202.

In some embodiments the decoder 109 further comprises a transport audio signal decoder 205 which is configured to decode the encoded transport audio signals 204 thereby producing the decoded transport audio signal stream 210 which is passed to the spatial synthesizer 207. The decoding process performed by the transport audio signal decoder 205 may be a suitable audio signal decoding scheme for the encoded transport audio signals, such as an EVS decoder when EVS encoding is used.

FIG. 2 also shows a metadata decoder 203 which is configured to accept the encoded spatial metadata (encoded spatial audio parameters) 202 and decode the metadata to produce the decoded spatial metadata 206. The decoding of the spatial metadata 206 is implemented as an inverse to the metadata encoding and thus in some embodiments an entropy decoding operation based on a determination of the entropy encoding mode implemented. In some embodiments as part of the decoding process, the metadata decoder 203 is configured to also produce a quality of encoding metric 208 for the decoded spatial audio parameters/metadata. The quality of encoding metric 208 is configured to be passed along with the decoded spatial metadata 206 to the spatial synthesizer 207.

The quality of encoding metric 208 for the spatial metadata (audio parameters) may be an indicator as to the performance of the entropy encoding and describes how well the spatial metadata was able to be encoded.

The metric may be obtained as frequency dependent $\Xi(k, n)$ (where k is the frequency band index and n the temporal frame (or subframe) index), or frequency independent $\Xi(n)$.

In the following examples the frequency independent variant $\Xi(n)$ is described but the frequency dependent embodiments are implemented in a similar manner. The scale of the metric can be any suitable range. In the following examples a metric range from 0 to 1 is described, where 1 means that the encoding reached the target resolution for the metadata and 0 means that effectively no information was able to be sent. Values between 0 and 1 mean that the target resolution was not reached but at least some information was able to be sent. In practice, $\Xi(n)$ is typically between 0.5 and 1.

The frequency independent Quality of encoding metric $\Xi(n)$ 208 can be defined, for example, as a relation of target bit budget and actual bits used in spatial direction encoding. This can be represented in some embodiments as:

$$\Xi(n) = \frac{B_{used}(n)}{B_{target}(n)}$$

Where $B_{target}(n)$ is the total bit budget intended for spatial direction coding for the current frame and $B_{used}(n)$ is the actual bits used after spatial direction encoding has been performed. For example, with MASA metadata coding in IVAS, $B_{target}(n)$ can be obtained with the aid of band-wise energy ratios $r_{dir}(k, n)$ and premade bit budget tables per quantized energy ratio values. In practice, this happens such that first band-wise energy ratios are quantized and assigned into corresponding energy ratio indices (e.g., from 0 to 7 with 3 bits). These indices are then used to access premade quantization bit budget table (e.g., 3, 5, 6, 7, 9, 10, 11, 11 corresponding to quantized energy ratio indices) to obtain bit budget for the spatial direction quantization for each frequency band. $B_{target}(n)$ can be then obtained simply as a sum of spatial direction quantization bit budgets over frequency (and time if necessary). For example, with 5 bands having ratio indices (starting from 0) of 5, 6, 7, 4, 1 would result in corresponding spatial direction bit budgets of 10, 11, 11, 9, 5, which sum to total of 46 bits as the $B_{target}(n)$.

In some further embodiments the $B_{used}(n)$ value can be obtained as the actual bits used. In such embodiments at the decoder it is deduced after the entropy encoding based bit transmission from subband to subband. Thus in such embodiments there is no need to explicitly indicate in the bitstream the number of bits used. In some encoding methods, $B_{used}(n)$ is always equal to $B_{target}(n)$ and the resulting $\Xi(n)$ is equal to 1. If these methods are used, then $\Xi(n)$ may be directly assigned a value of 1. However, these methods cannot be used if the allowed total bit budget $B_{allowed}(n)$ is less than the target bitrate $B_{target}(n)$. In such embodiments a reduction in quantization accuracy may be done in various ways and the method described in GB1811071.8 is a suitable example. As an additional note, since during the encoding itself there are several readjustments of the bit allocation per subband or time frequency tile, the resulting bit budget should be calculated after the decoding procedure as the sum of the subband/time-frequency tile individual bit allocations. These reduction methods can report the actual used bitrate $B_{used}(n)$ and with it being less than the target bitrate $B_{target}(n)$, the metric $\Xi(n)$ will be also smaller than 1. Thus, the metric will in this case practically tell how many bits had to be reduced from the target bit budget $B_{target}(n)$ via spatial direction quantization accuracy reduction to fit the allowed bit budget $B_{allowed}(n)$. It should be noted that $B_{used}(n)$ may be close to $B_{allowed}(n)$ but not necessarily equal to it. In some example embodiments, $B_{used}(n)$ may be larger than $B_{allowed}(n)$ if specific conditions happen. Regardless, $B_{used}(n) \leq B_{target}(n)$ should still typically hold and the equation described above be used. Furthermore, in some embodiments, where $B_{used}(n)$ is larger than $B_{allowed}(n)$, then the quality of encoding metric $\Xi(n)$ 208 is set to 1.

In some embodiments the decoder comprises a spatial synthesizer 207 configured to receive the quality of encoding metric $\Xi(n)$ 208, the decoded spatial metadata 206 and decoded transport audio signals 210. The spatial synthesiser 207 is then configured to render spatial audio output signals, e.g., binaural audio signals. In such embodiments the spatial synthesiser 207 is configured to employ the quality of encoding metric 208 to adjust the rendering which enables a optimized spatial audio quality, both with good-quality spatial metadata (e.g., typically found at high bitrates) and compromised spatial metadata (e.g., sometimes with critical signal content at low bitrates).

Figure 3:
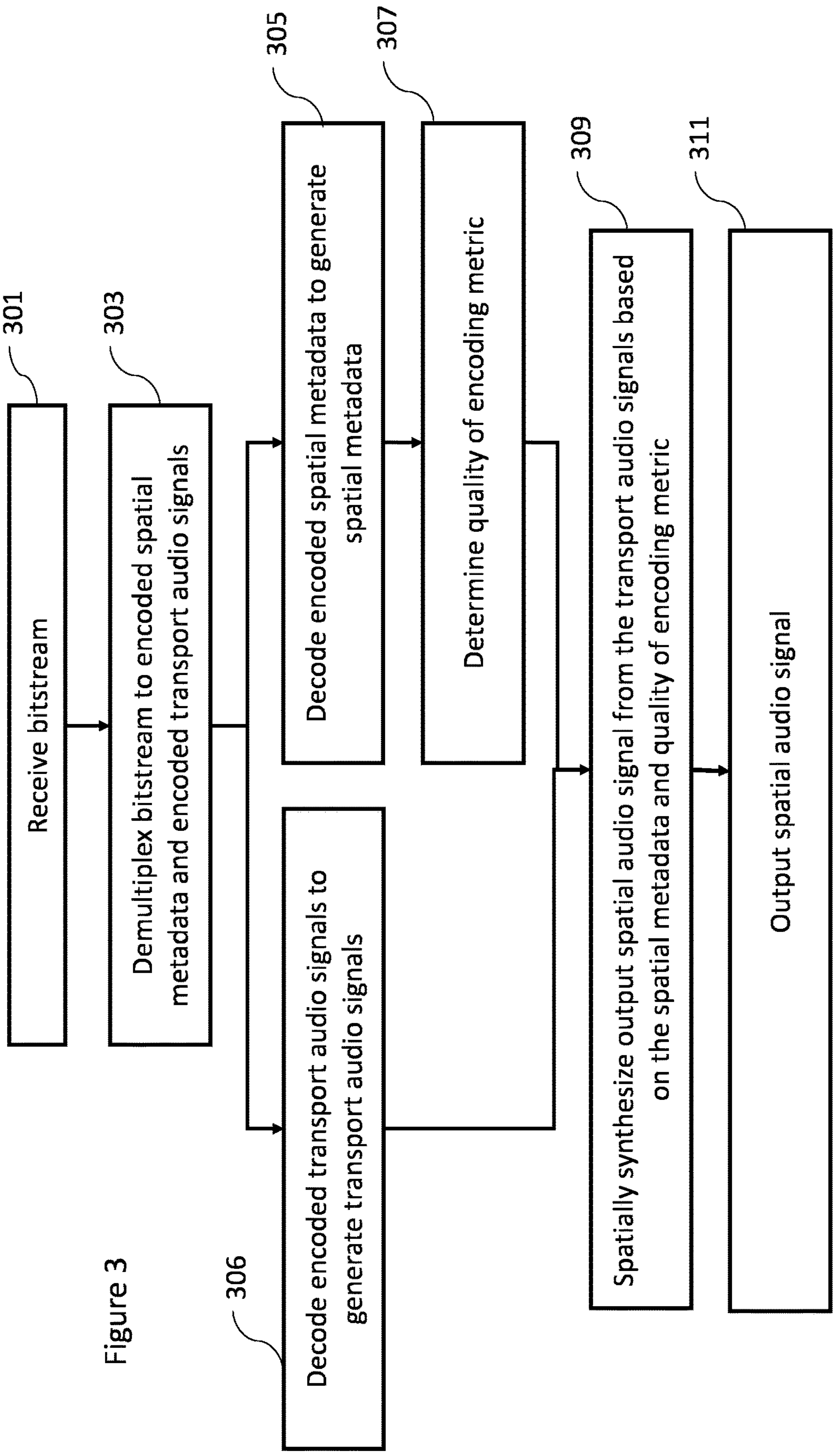
FIG. 3 shows a flow diagram of the operation of the example decoder shown in FIG. 2 according to some embodiments.

FIG. 3 shows a flow diagram showing a summary of example operations implemented by the decoder as shown in FIG. 2 according to some embodiments.

For example FIG. 3 shows the bitstream being received at step 301.

The bitstream is then demultiplexed into encoded spatial metadata and encoded transport audio signals as shown in FIG. 3 by step 303.

The encoded transport audio signals are then decoded to generate transport audio signals as shown in FIG. 3 by step 306.

The encoded spatial metadata is furthermore decoded to generate spatial metadata as shown in FIG. 3 by step 305.

Additionally a quality of encoding metric is generated as shown in FIG. 3 by step 307.

The output spatial audio signals are then spatially synthesized from the transport audio signals based on the spatial metadata and the quality of encoding metric as shown in FIG. 3 by step 309.

Furthermore the output spatial audio signals are then output as shown in FIG. 3 by step 311.

Figure 4:
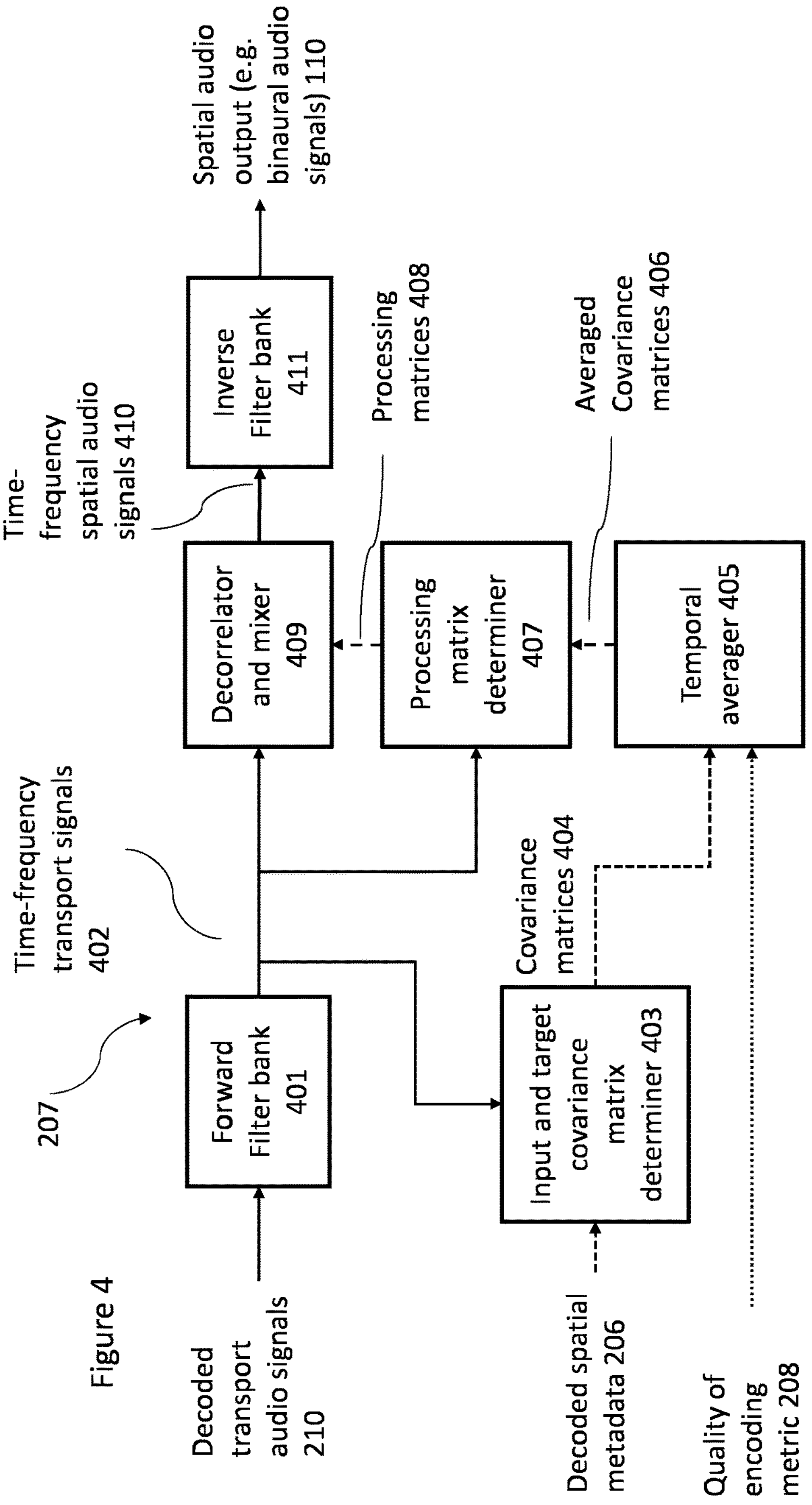
FIG. 4 shows schematically an example synthesis processor as shown in FIG. 2 according to some embodiments.

With respect to FIG. 4 is shown the spatial synthesizer 207 in further detail according to some embodiments.

In some embodiments the spatial synthesizer 207 comprises a Forward Filter Bank (time-frequency transformer) 401. The Forward Filter Bank (time-frequency transformer) 401 is configured to receive the (time-domain) decoded transport audio signals 210 and convert them to the time-frequency domain. Suitable forward filters or transforms include, e.g., short-time Fourier transform (STFT) and complex-modulated quadrature mirror filterbank (QMF). The resulting signals may be denoted as $x_i(b, n)$, where i is the channel index, b the frequency bin index of the time-frequency transform, and n the time index. The time-frequency signals are for example expressed here in a vector form (for example for two channels the vector form is):

$$x(b, n) = \begin{bmatrix} x_1 b, n \\ x_2(b, n) \end{bmatrix}$$

The following processing operations may then be implemented within the time-frequency domain and over frequency bands. A frequency band can be one or more frequency bins (individual frequency components) of the applied time-frequency transformer (filter bank). The frequency bands could in some embodiments approximate a perceptually relevant resolution such as the Bark frequency bands, which are spectrally more selective at low frequencies than at the high frequencies. Alternatively, in some implementations, frequency bands can correspond to the frequency bins. The frequency bands may be those (or approximate those) where the spatial metadata has been determined by the analysis processor. Each frequency band k may be defined in terms of a lowest frequency bin $b_{low}(k)$ and a highest frequency bin $b_{high}(k)$.

The time-frequency transport signals 402 in some embodiments may be provided to an input and target (or output) covariance matrix determiner 403, a processing matrix determiner 407 and a decorrelator and mixer 409.

In some embodiments the spatial synthesizer 207 comprises an input and target (or output) covariance matrix determiner 403. The input and target covariance matrix determiner 403 is configured to receive the decoded spatial metadata 206 and the time-frequency transport signals 402 and determine the covariance matrices. The determined covariance matrices comprise an input covariance matrix representing the time-frequency transport signals 402 and an output covariance matrix representing the time-frequency spatial audio signals 410. The input covariance matrix can be measured from the time-frequency transport signals 402, denoted as a column vector x(b, t) where b is the frequency bin index and t is the time-frequency signal temporal index, and where the row indicates the transport signal channel. This, in some embodiments, is achieved by:

$$C_x(b, n) = \sum_{t=t_1(n)}^{t_2(n)} x(b, t)x^H(b, t)$$

where the superscript H indicates a conjugate transpose and $t_1(n)$ and $t_2(n)$ are the first and last time-frequency signal temporal indices corresponding to frame n. In some embodiments, there are four time indices t at each frame n. As discussed above, the covariance matrix is determined for each bin. In some other embodiments, the covariance matrix is also averaged (or summed) over multiple frequency bins, in a resolution that approximates human hearing resolutions, or in the resolution of the determined spatial metadata parameters.

The target covariance matrix in some embodiments is determined based on the spatial metadata and the overall signal energy. The overall signal energy E(b, n) can be obtained as the mean of the diagonal values of $C_x(b, n)$. Then, in some embodiments, the spatial metadata comprises a direction DOA(k, n) and a direct-to-total ratio parameter r(k, n). Note that the band index k is the one where the bin b resides. In some embodiments where the spatial audio output is a binaural signal, the target covariance matrix can be determined as:

$$C_y(b, n) = E(b, n)r(k, n)h(b, DOA(k, n))h^H(b, DOA(k, n)) + E(b, n)(1 - r(k, n))C_d(b)$$

where h(b, DOA(k, n)) is a head-related transfer function column vector for bin b and DOA(k, n) and is a column vector of length two with complex values, where the values correspond to the HRTF amplitude and phase for left and right ears. In high frequencies, the HRTF values may be also real because phase differences are not needed for perceptual reasons at high frequencies. HRTFs for a given direction and frequency can be determined based on any suitable method. $C_d(b)$ is the diffuse field binaural covariance matrix, which can be determined for example in an offline stage by taking a spatially uniform set of HRTFs, formulating their covariance matrices independently, and averaging the result.

The input covariance matrix $C_x(b, n)$ and the target covariance matrix $C_y(b, n)$ can then be output as covariance matrices 404 to a temporal averager 405.

The above example describes the use of directions and ratios. The procedure of generating a target covariance matrix has been detailed also more broadly in GB2572650 where additionally to the directions and ratios, spatial coherence parameters were also described, and furthermore, other output types than binaural output were also covered.

In some embodiments the spatial synthesizer 207 comprises a temporal averager 405. The temporal averager 405 is configured to receive the covariance matrices 404 $C_x(b, n)$ and $C_y(b, n)$ and the quality of encoding metric 208 $\Xi(n)$. The temporal averager 405 is configured with a memory of averaged covariance matrices $C'_x(b, n)$ and $C'_y(b, n)$ which are defined as matrices of zeros when $n<0$. The temporal averager 405 in some embodiments is configured to operate according to infinite impulse response (IIR) type averaging, but utilize energy values at the recurrent processing.

For example denoting $E'_x(b, n)$ as the mean of the diagonal of $C'_x(b, n)$ and $E_x(b, n)$ as the mean of the diagonal of $C_x(b, n)$ and equivalently for subscript y. The averaging operation can in some embodiments be written as:

$$C'_x(b, n) = C'_x(b, n-1)\min\left(1, \frac{\alpha(\Xi(n))E_x(b, n)}{E_x(b, n)}\right) + \beta(\Xi(n))C_x(b, n)$$

and equivalently for subscript y. The above implementations are first order IIR-like averaging, however, with an exception that when the energy $E_x(b, n)$ of the new input signal falls rapidly when compared to the averaged energy $E'_x(b, n)$, then the IIR processing starts to suppress the energy from prior step $C'_x(b, n-1)$. In such a manner, a loud sound that suddenly stops does not significantly remain to affect the IIR averaged values significantly after its offset. This procedure essentially avoids a processing error that soft sounds after a loud sound are processed for a short period to wrong directions.

In some embodiments, the operators $\alpha(\Xi(n))$ and $\beta(\Xi(n))$ provide control to the forget/remember rate of the IIR processing based on the quality of the encoding value $\Xi(n)$. The value $\alpha(\Xi(n))$ controls how much of the prior signal energy is kept in the memory (i.e., more averaging), and $\beta(\Xi(n))$ controls how much the new frame affects the averaged covariance matrices. In some embodiments the quality of encoding and the variation of the quality over time is used to use these control parameters. In some embodiments the encoding is assumed to erratically provide good or worse encodings due to different bit budget allocations, and thus these parameters are defined as $$\alpha(\Xi(n)) = c + (1 - \Xi(n)^p)$$
$$\beta(\Xi(n)) = \Xi(n)^p$$

c and p are coefficients controlling the amount of smoothing (e.g., c=2 and p=2).

In some embodiments only $\alpha$ or $\beta$ is modified based on the quality of the encoding metric $\Xi(n)$, and a fixed value is employed for the other one. Moreover, also other methods based on $\Xi(n)$ could be employed to perform the smoothing.

The temporal averager 405 can then be configured to output the averaged covariance matrices 406 $C'_x(b, n)$ and $C'_y(b, n)$.

In some embodiments the spatial synthesizer 207 comprises a processing matrix determiner 407. The processing matrix determiner 407 is configured to receive the averaged covariance matrices $C'_x(b, n)$ and $C'_y(b, n)$ 406 and the time-frequency transport signals 402 and determines processing matrices M(b, n) and $M_r(b, n)$ 408. The determination of the processing matrices based on the covariance matrices can be implemented based on suitable methods such as described within Juha Vilkamo, Tom Bäckström, and Achim Kuntz. "*Optimized covariance domain framework for time-frequency processing of spatial audio.*" *Journal of the Audio Engineering Society* 61.6 (2013): 403-411. In the disclosure a determination of mixing matrices for processing audio signals with a measured covariance matrix $C'_x(b, n)$, so that they attain a determined target covariance matrix $C'_y(b, n)$. The method has been used in various use cases in the literature, including generation of binaural or surround loudspeaker signals. In formulating the processing matrices, the method further determines a prototype matrix which is a matrix that tells the optimization procedure which kind of signals generally are meant for each of the outputs (with a constraint that the output must attain the target covariance matrix). For example, in some embodiments implementing binaural sound reproduction, the prototype matrix can be $$\begin{bmatrix} 1 & 0.01 \\ 0.01 & 1 \end{bmatrix}$$

which means that the left ear signal is predominantly rendered from the left transport channel and right from the right transport channel. Similarly, if the user's head orientation is tracked and the user faces towards the rear half-sphere then the prototype matrix can be for example $$\begin{bmatrix} 0.01 & 1 \\ 1 & 0.01 \end{bmatrix}.$$

The processing matrices determiner 407 then outputs the processing matrices M(b, n) and $M_r(b, n)$ 408.

In some embodiments the spatial synthesizer 207 comprises a decorrelator and mixer 409 configured to receive the time-frequency transport signals x(b, t) 402 and the processing matrices M(b, n) and $M_r(b, n)$ 408. The decorrelator and mixer 409 is configured to first process the input time-frequency transport signals with the prototype matrix determined in the processing matrix determiner 407, and then decorrelate the result, thus generating decorrelated signals $x_D(b, t)$. The decorrelator and mixer 409 is then configured to apply a mixing procedure to generate the time-frequency spatial audio signals 410

$$y(b, t) = M(b, n)x(b, t) + M_r(b, n)x_D(b, t)$$

Although not explicitly written in the equation, the processing matrices may be linearly interpolated between frames n so that at each temporal index of the time-frequency signal the matrices take a step from M(b, n−1) towards M(b, n). The interpolation rate may be dependent on if an onset is detected (fast interpolation) or not (normal interpolation). The time frequency spatial audio signals y(b, t) 410 are then output.

In some embodiments the spatial synthesizer 207 comprises an inverse filter bank 411 configured to receive the spatial time-frequency domain audio signals 410 and applies an inverse transform corresponding to the transform applied by the Forward Filter Bank 401 to generate a time domain spatial output signal 110. The output of the inverse filter bank 411 may thus be spatial output signal 110, which could be, for example, a binaural audio signal for headphone listening.

The above covariance matrix based rendering scheme of FIG. 4 is only one example configuration and in some further embodiments other configurations are implemented. For example in some embodiments, the audio signals could be divided into directional and non-directional parts (or directional and non-directional sounds) in frequency bands based on the ratio parameter; then the directional part could be positioned to virtual loudspeakers using amplitude panning, the non-directional part could be distributed to all loudspeakers and decorrelated, and then the processed directional and non-directional parts could be added together, and finally, each virtual loudspeaker is processed with HRTFs to obtain the binaural output. This procedure is described in further detail in the context of a DirAC rendering scheme as described in Laitinen, M. V., & Pulkki, V. (2009 October). *Binaural reproduction for directional audio coding. In* 2009 *IEEE Workshop on Applications of Signal Processing to Audio and Acoustics* (pp. 337-340). In this disclosure the quality of encoding metric can be employed to control the temporal averaging of the audio processing operations, especially the processing gains that position the directional part to the virtual loudspeakers.

Similar methods can also be applied for the rendering of multichannel loudspeaker signals (e.g., 5.1). In this case, the virtual loudspeakers would be replaced by actual loudspeakers, and the combined loudspeaker signals would be outputted as the multichannel loudspeaker signals without the binauralization applied.

Figure 5:
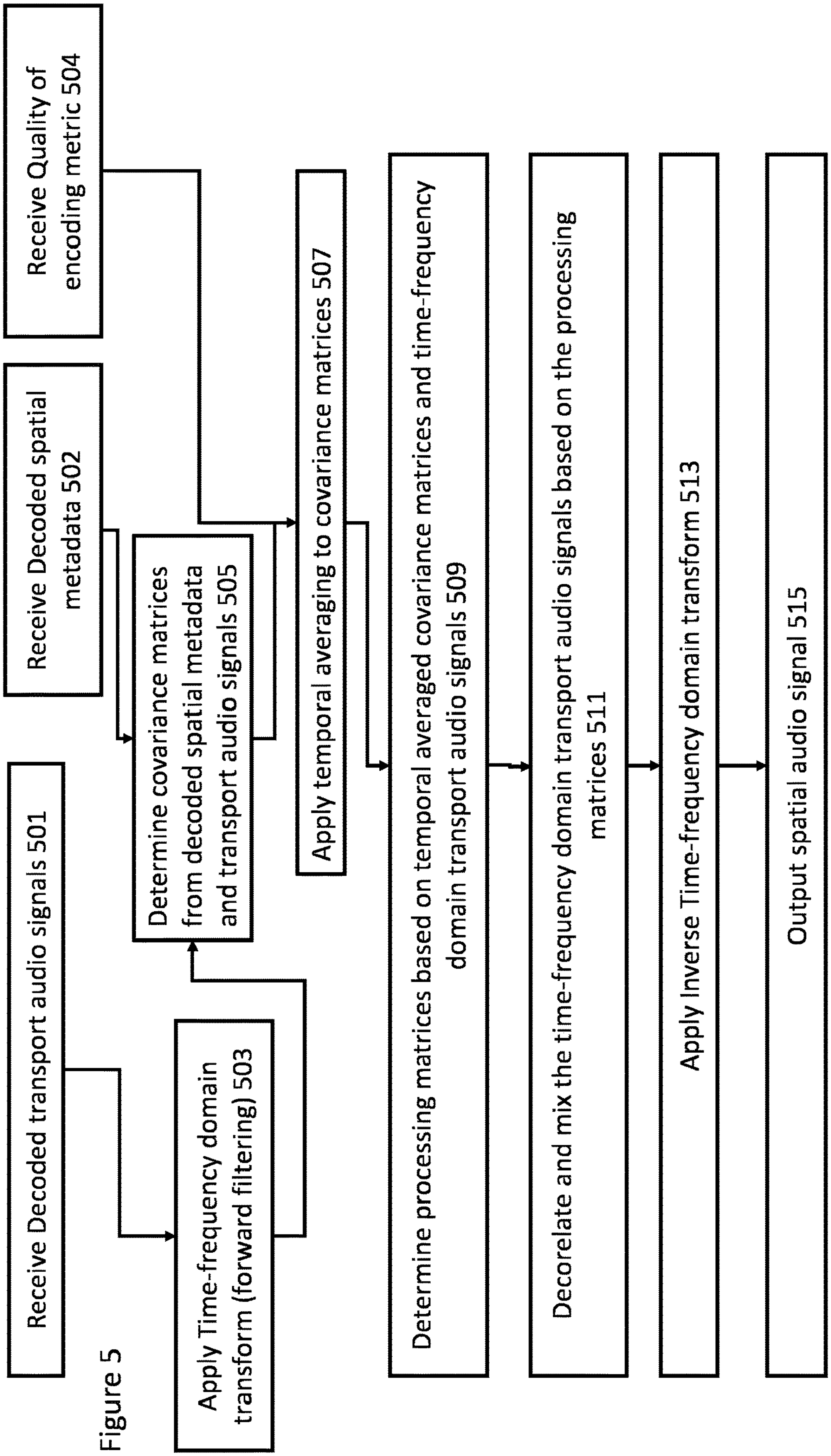
FIG. 5 shows a flow diagram of the operation of the example synthesis processor as shown in FIG. 4 according to some embodiments.

With respect to FIG. 5 is shown a flow diagram showing the operations of the spatial synthesizer example shown in FIG. 4.

For example FIG. 5 shows the operation of receiving the decoded transport audio signals in step 501.

Additionally the decoded transport audio signals are then time-frequency domain transformed as shown in FIG. 5 by step 503.

The decoded spatial metadata is received as shown in FIG. 5 by step 502.

The covariance matrices are then determined based on the decoded spatial metadata and the decoded transport audio signals as shown in FIG. 5 by step 505.

The quality of the encoding metric is also received in FIG. 5 by step 504.

The temporal averaging of the covariance matrices based on the quality of the encoding metric is shown in FIG. 5 by step 507.

The determining of processing matrices based on temporal averaged covariance matrices and time-frequency domain transport audio signals is shown in FIG. 5 by step 509.

The decorrelation and mixing of the time-frequency domain transport audio signals based on the processing matrices is then shown in FIG. 5 by step 511.

An application of an Inverse Time-frequency domain transform to generate the spatial audio signals is then shown in FIG. 5 by step 513.

Then the spatial audio signal is then output as shown in FIG. 5 by step 515.

In some embodiments the frequency independent quality of encoding metric $\Xi(n)$ can be defined alternatively as relation of target spatial direction quantization resolution $\eta_{target}(k, n)$ metric and achieved spatial direction quantization resolution $\eta_{actual}(k, n)$ metric per each frequency band k and time frame n. These metrics directly represent the minimum accuracy for quantization of spatial direction represented as a distance on a sphere, i.e., spatial angle. These metrics can be predetermined for each allowed bit budget, e.g., 11 bits could allow 4° minimum accuracy and 5 bits could allow 36° minimum accuracy. To obtain a comparable quality of encoding metric $\Xi(n)$, such a method would first obtain a band-wise metrics as:

$$\Xi(k, n) = \frac{\eta_{actual}(k, n)}{\eta_{target}(k, n)}$$

and then combine these band-wise metrics into frequency independent metric, for example, with a mean as follows:

$$\Xi(n) = \frac{1}{K}\sum_{k=1}^{K}\Xi(k, n)$$

In such embodiments K is the total number of frequency bands. This combination could be implemented in various other ways as well, e.g., using maximum or minimum function, median function, sum function, or having weights on the average. Additionally, in some embodiments the band-wise metrics or the frequency independent metric could apply a logarithmic or exponential function to the values. It may be that there are individual values for the spatial direction resolution for each time-frequency (TF) tile within a subband. In such embodiments $\eta_{actual}(k, n)$ can be obtained by averaging the values over the TF tiles.

As mentioned above, in some embodiments, the quality of encoding metric $\Xi(n)$ can be set to a value based on other information than what is used normally. For example the encoding metric can be based on the bits used, or a parameter related to the quantization resolution of the encoded metadata, for example a spatial direction quantization resolution, or a ratio between quantization resolutions used for encoding the metadata. One such case is when there is a priori knowledge that a specific encoding method always achieves the targeted quality. In such cases, $\Xi(k, n)=1$ always. Another such case is when $\eta_{actual}(k, n)$ is deemed to be good enough for each frequency band k regardless of the value of $\eta_{target}(k, n)$. This is relevant, for example, in very low bitrate use cases where the resultant output might not be a good quality output.

As discussed above, the (frequency independent) quality of encoding metric $\equiv(n)$ can be defined, for example, as a relation of target bit budget and actual bits used in spatial direction encoding. In further embodiments, the metric can take into account at least one of the following:

Direct-to-total energy ratio of each affected Direction; and

Direct-to-total energy ratio*total energy of each affected Direction

In some embodiments, the quality of encoding metric can be (at least partially) frequency dependent. This frequency dependency may relate at least to the TF resolution of the spatial metadata quantizer. For example using the embodiment above, the $\alpha$ and $\beta$ can be determined as frequency dependent values based on the frequency dependent $\Xi(k, n)$. In these embodiments the rest of the rendering procedure can be performed as presented above.

The example embodiments presented above adjust the temporal smoothing based on the quality of encoding metric. In some alternative embodiments, it is also possible to adjust the rendering in other ways (instead of or in addition to the temporal smoothing). A few examples are presented below:

In some embodiments, the direct-to-total energy ratio r(k, n) can be adjusted based on the quality of encoding metric $\Xi(n)$. The idea is to drop the direct-to-total energy ratio r(k, n) when the encoding quality is lower than 1. As a result, less sound is rendered as directional, and thus fluctuating directions are less perceived. This can, e.g., be implemented as follows. First, the direct-to-total energy ratios are modified, e.g., by $$r'(k, n) = r(k, n)\Xi(n)^{p_2}$$

where $p_2$ is controlling the amount of adjustment (e.g., having the values of 0.5, 1, or 2). Then, the processing can be performed normally using r'(k, n) instead of r(k, n).

In some embodiments, the direct sound rendering patterns can be modified based on the quality of encoding metric Ξ(n). For example, instead of using point-like HRTFs, HRTFs corresponding to wider sources can be used when Ξ(n) is smaller than 1 (e.g., based on first-order patterns). This effectively reduces the perceived directional accuracy, and thus mitigates artefacts due to fluctuating directions.

In some embodiments, the directions can be smoothed over time based on the quality of encoding metric Ξ(n). Thus, for example, when Ξ(n)=1, the original directions may be used, but when Ξ(n)<1, smoothing over time may be performed for the directions. This can, for example, be performed by converting the directions to Cartesian coordinate vectors and smoothing them over time using an IIR filter.

Figure 6:
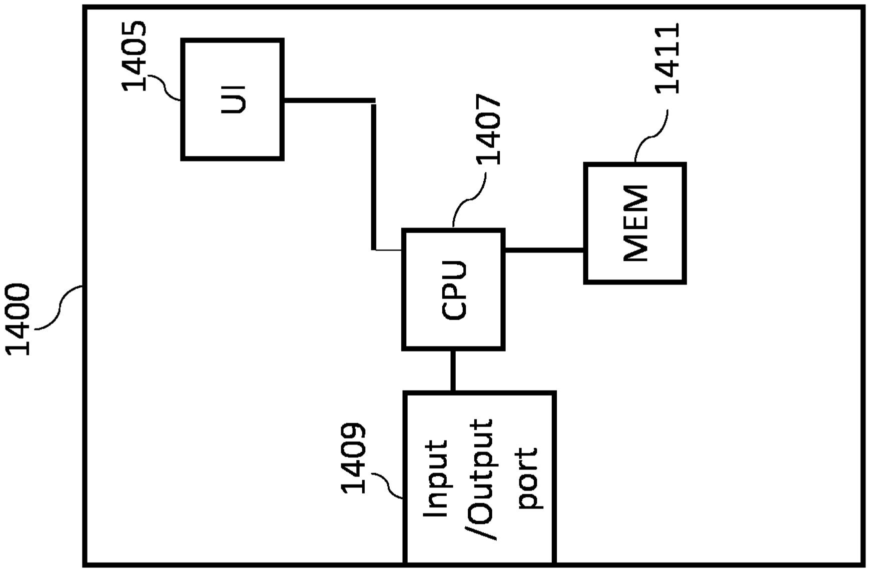
FIG. 6 shows an example device suitable for implementing the apparatus shown in previous figures.

With respect to FIG. 6 an example electronic device which may be used as any of the apparatus parts of the system as described above. The device may be any suitable electronics device or apparatus. For example, in some embodiments the device 1400 is a mobile device, user equipment, tablet computer, computer, audio playback apparatus, etc. The device may for example be configured to implement the encoder/analyser part and/or the decoder part as shown in FIG. 1 or any functional block as described above.

In some embodiments the device 1400 comprises at least one processor or central processing unit 1407. The processor 1407 can be configured to execute various program codes such as the methods such as described herein.

In some embodiments the device 1400 comprises at least one memory 1411. In some embodiments the at least one processor 1407 is coupled to the memory 1411. The memory 1411 can be any suitable storage means. In some embodiments the memory 1411 comprises a program code section for storing program codes implementable upon the processor 1407. Furthermore, in some embodiments the memory 1411 can further comprise a stored data section for storing data, for example data that has been processed or to be processed in accordance with the embodiments as described herein. The implemented program code stored within the program code section and the data stored within the stored data section can be retrieved by the processor 1407 whenever needed via the memory-processor coupling.

In some embodiments the device 1400 comprises a user interface 1405. The user interface 1405 can be coupled in some embodiments to the processor 1407. In some embodiments the processor 1407 can control the operation of the user interface 1405 and receive inputs from the user interface 1405. In some embodiments the user interface 1405 can enable a user to input commands to the device 1400, for example via a keypad. In some embodiments the user interface 1405 can enable the user to obtain information from the device 1400. For example the user interface 1405 may comprise a display configured to display information from the device 1400 to the user. The user interface 1405 can in some embodiments comprise a touch screen or touch interface capable of both enabling information to be entered to the device 1400 and further displaying information to the user of the device 1400. In some embodiments the user interface 1405 may be the user interface for communicating.

In some embodiments the device 1400 comprises an input/output port 1409. The input/output port 1409 in some embodiments comprises a transceiver. The transceiver in such embodiments can be coupled to the processor 1407 and configured to enable a communication with other apparatus or electronic devices, for example via a wireless communications network. The transceiver or any suitable transceiver or transmitter and/or receiver means can in some embodiments be configured to communicate with other electronic devices or apparatus via a wire or wired coupling.

The transceiver can communicate with further apparatus by any suitable known communications protocol. For example in some embodiments the transceiver can use a suitable radio access architecture based on long term evolution advanced (LTE Advanced, LTE-A) or new radio (NR) (or can be referred to as 5G), universal mobile telecommunications system (UMTS) radio access network (UTRAN or E-UTRAN), long term evolution (LTE, the same as E-UTRA), 2G networks (legacy network technology), wireless local area network (WLAN or Wi-Fi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs), cellular internet of things (IoT) RAN and Internet Protocol multimedia subsystems (IMS), any other suitable option and/or any combination thereof.

The transceiver input/output port 1409 may be configured to receive the signals.

In some embodiments the device 1400 may be employed as at least part of the synthesis device. The input/output port 1409 may be coupled to headphones (which may be a headtracked or a non-tracked headphones) or similar and loudspeakers.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general-purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus comprising at least one processor; and at least one memory storing instructions that, when executed by the at least one processor, cause the apparatus to at least:

obtain a bitstream comprising encoded spatial metadata and encoded transport audio signals;

decode transport audio signals from the encoded transport audio signals of the bitstream;

decode spatial metadata from the encoded spatial metadata of the bitstream;

generate an encoding metric;

generate a smoothing control based on the encoding metric; and generate spatial audio signals from the transport audio signals based on the encoding metric and the spatial metadata, wherein the spatial audio signals are generated from the transport audio signals based on the smoothing control and the spatial metadata.

2. The apparatus as claimed in claim 1, wherein the apparatus is caused to generate spatial audio signals from the transport audio signals based on the encoding metric and the spatial metadata by modifying at least an energy ratio from the spatial metadata based on the encoding metric, wherein the spatial audio signals are generated from the transport audio signals based on the modified energy ratio and the spatial metadata.

3. The apparatus as claimed in claim 1, wherein the apparatus is caused to generate spatial audio signals from the transport audio signals based on the encoding metric and the spatial metadata by positioning a directional sound to a direction determined by the spatial metadata, and wherein a width of the directional sound is based on the encoding metric.

4. The apparatus as claimed in claim 1, wherein the apparatus is caused to generate a spatial audio signal from the transport audio signals based on the encoding metric and the spatial metadata by:

generating covariance matrices from the transport audio signals and the spatial metadata based on the encoding metric;

generating processing matrices based on the covariance matrices; and decorrelating and/or mixing the transport audio signals based on the processing matrices to generate the spatial audio signals.

5. The apparatus as claimed in claim 4, wherein the covariance matrices comprise at least one of:

input covariance matrices, representing the transport audio signals; and target covariance matrices, representing the spatial audio signals.

6. The apparatus as claimed in claim 5, wherein the apparatus is caused to generate covariance matrices from the transport audio signals and the spatial metadata by generating the input covariance matrices by measuring the transport audio signals in a time-frequency domain.

7. The apparatus as claimed in claim 5, wherein the apparatus is caused to generate covariance matrices from the transport audio signals and the spatial metadata by generating the target covariance matrices based on the spatial metadata and transport audio signal energy.

8. The apparatus as claimed in claim 4, wherein the apparatus is further caused to apply temporal averaging to the covariance matrices to generate averaged covariance matrices, the temporal averaging being based on the smoothing control, wherein the apparatus is caused to generate the processing matrices based on the covariance matrices by generating the processing matrices from the averaged covariance matrices.

9. The apparatus as claimed in claim 4, wherein the apparatus is caused to generate spatial audio signals from the transport audio signals based on the encoding metric and the spatial metadata by modifying at least an energy ratio from the spatial metadata based on the encoding metric, wherein the spatial audio signals are generated from the transport audio signals based on the modified energy ratio and the spatial metadata, and wherein the apparatus is caused to generate covariance matrices from the transport audio signals and the spatial metadata by generating the covariance matrices based on the modified energy ratio.

10. The apparatus as claimed in claim 4, wherein the apparatus is caused to generate spatial audio signals from the transport audio signals based on the encoding metric and the spatial metadata by positioning a directional sound to a direction determined by the spatial metadata, wherein a width of the directional sound is based on the encoding metric, and wherein the apparatus is caused to generate covariance matrices from the transport audio signals by generating the covariance matrices based on the positioning of the directional sound to the direction determined by the spatial metadata wherein the width of the directional sound is based on the encoding metric.

11. The apparatus as claimed in claim 1, wherein the apparatus is caused to generate spatial audio signals from the transport audio signals based on the encoding metric and the spatial metadata by:

obtaining at least one direct-to-total energy ratio parameter based on the spatial metadata;

dividing the transport audio signals into directional and non-directional parts in frequency bands based on at least one direct-to-total energy ratio parameter from the spatial metadata;

positioning the directional part of the transport audio signals to at least one of a plurality of loudspeakers using amplitude panning;

distributing and decorrelating the non-directional part of the transport audio signals to all of the plurality of loudspeakers; and generating combined audio signals based on combining the positioned directional part of the transport audio signals and non-directional part of the transport audio signals.

12. The apparatus as claimed in claim 11, wherein the loudspeakers are virtual loudspeakers, and the apparatus is further caused to generate a binaural spatial audio signal by the application of a head-related transfer function to the combined audio signals.

13. The apparatus as claimed in claim 11, wherein apparatus is caused to generate spatial audio signals from the transport audio signals based on the encoding metric and the spatial metadata by modifying at least an energy ratio from the spatial metadata based on the encoding metric, wherein the spatial audio signals are generated from the transport audio signals based on the modified energy ratio and the spatial metadata, and wherein the apparatus is caused to obtain at least one direct-to-total energy ratio parameter based on the spatial metadata by obtaining the at least one direct-to-total energy ratio from the modified energy ratio.

14. The apparatus as claimed in claim 11, wherein the apparatus is further caused to position the directional part of the transport audio signals to at least one of a plurality of loudspeakers using amplitude panning by positioning the directional part of the transport audio signals to at least one of a plurality of loudspeakers using amplitude panning based on the smoothing control.

15. The apparatus as claimed in claim 11, wherein the apparatus is caused to generate spatial audio signals from the transport audio signals based on the encoding metric and the spatial metadata by positioning a directional sound to a direction determined by the spatial metadata, wherein a width of the directional sound is based on the encoding metric, and wherein the apparatus is caused to position the directional sound to the direction determined by the spatial metadata by positioning of the directional sound to the at least one of the plurality of loudspeakers using amplitude panning, wherein a width of the positioning is based on the encoding metric.

16. The apparatus as claimed in claim 1, wherein the apparatus is caused to generate the encoding metric by generating the encoding metric based on a quality of representation of the spatial metadata.

17. An apparatus comprising at least one processor; and at least one memory storing instructions that, when executed by the at least one processor, cause the apparatus to at least:

obtain a bitstream comprising encoded spatial metadata and encoded transport audio signals;

decode transport audio signals from the encoded transport audio signals of the bitstream;

decode spatial metadata from the encoded spatial metadata of the bitstream;

generate an encoding metric from the encoded spatial metadata and the spatial metadata; and generate spatial audio signals from the transport audio signals based on the encoding metric and the spatial metadata.

18. The apparatus as claimed in claim 17, wherein the apparatus is caused to generate an encoding metric from the encoded spatial metadata and the spatial metadata by:

determining a first parameter indicating a number of bits intended or allocated for encoding a spatial parameter for a frame;

determining a second parameter indicating a number of bits used after encoding the spatial parameter has been performed for the frame; and generating the encoding metric as a ratio between the first and second parameters.

19. The apparatus as claimed in claim 1, wherein the apparatus is caused to generate the encoding metric by generating the encoding metric based on at least one of:

a quantization resolution of the spatial metadata; and a ratio between at least two quantization resolutions of the spatial metadata.

20. A method comprising:

obtaining a bitstream comprising encoded spatial metadata and encoded transport audio signals;

decoding transport audio signals from the encoded transport audio signals of the bitstream;

decoding spatial metadata from the encoded spatial metadata of the bitstream;

generating an encoding metric;

generating a smoothing control based on the encoding metric; and generating spatial audio signals from the transport audio signals based on the encoding metric and the spatial metadata, wherein the spatial audio signals are generated from the transport audio signals based on the smoothing control and the spatial metadata.

* * * * *